A. W. LIVINGSTON.
TIRE.
APPLICATION FILED SEPT. 22, 1913.

1,127,039.

Patented Feb. 2, 1915.

WITNESSES:
H. A. Stock
F. P. Schroeder

INVENTOR
Andrew W. Livingston
by Harry C. Schroeder
ATTORNEY

UNITED STATES PATENT OFFICE.

ANDREW W. LIVINGSTON, OF OAKLAND, CALIFORNIA, ASSIGNOR TO STANDARD STEEL WHEEL AND TIRE ARMOR COMPANY, OF OAKLAND, CALIFORNIA, A CORPORATION OF ARIZONA.

TIRE.

1,127,039. Specification of Letters Patent. Patented Feb. 2, 1915.

Application filed September 22, 1913. Serial No. 791,100.

*To all whom it may concern:*

Be it known that I, ANDREW W. LIVINGSTON, a citizen of the United States, residing at Oakland, in the county of Alameda and State of California, have invented certain new and useful Improvements in Tires, of which the following is a specification.

This invention relates to improvements in pneumatic tires the object of which is to construct a tire having an interior metallic protecting armor, which will not lessen the resiliency of the tire. With this end in view the armor consists of a plurality of interlocking plates placed between the inner tube and outer casing, said plates being capable of a slight movement one on the other which allows the tire to be deformed at any point.

With these objects in view my invention consists in the new and novel arrangement and construction of parts as herein described and illustrated in the accompanying drawing and as more particularly pointed out in the annexed claims.

Figure 1:
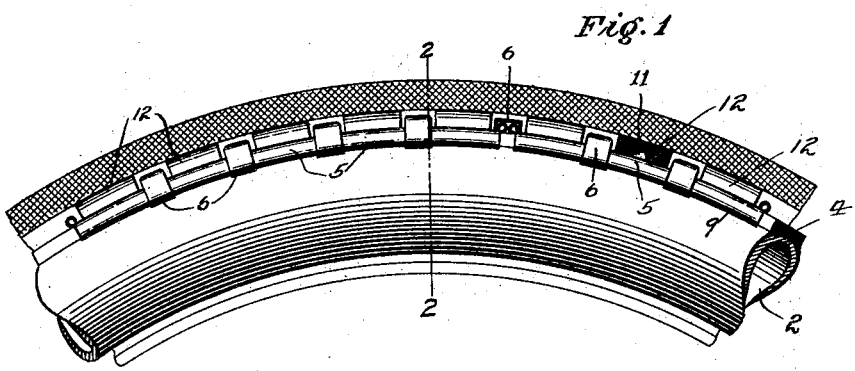
Figure 2:
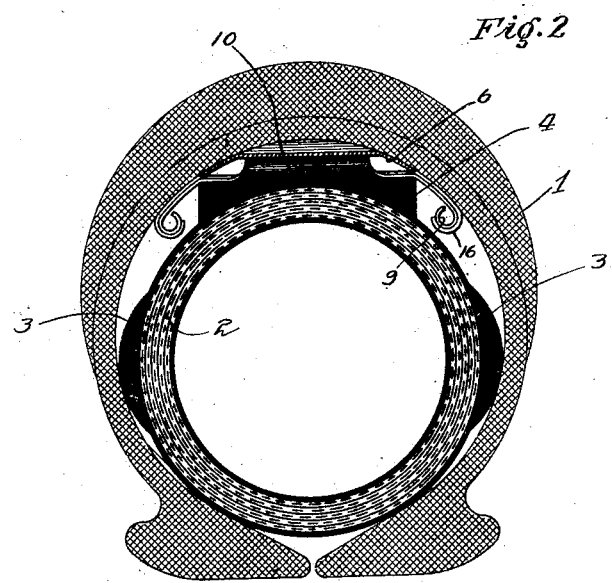
Figures 3, 4:
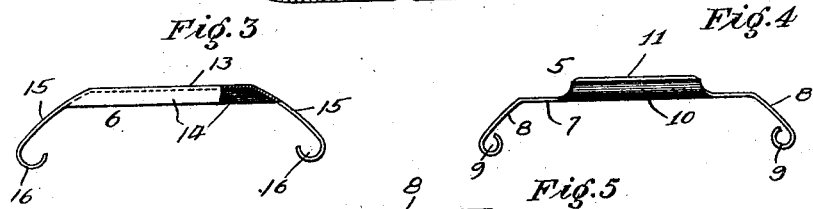
Figure 5:
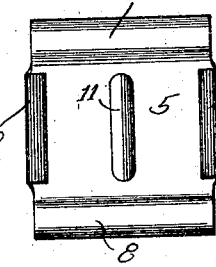

For a full comprehension of the invention reference should be had to the drawings forming a part of this specification wherein, Figure 1 is a view in section of a portion of tire showing the improved flexible armor arranged therein. Fig. 2 is a view in cross section of the tire on the line 2—2 Fig. 1. Fig. 3 is a view partly in end elevation and partly in section of what is hereinafter termed the locking member. Fig. 4 is a view in end elevation of an armor plate. Fig. 5 is a top plan view of one section of the armor.

Denoting the same parts in the several views by corresponding numerals 1 is an outer casing having any of the usual shapes, in fact, is a "stock" casing. 2 is an inner tube of heavier construction than usual, being made to withstand the usual pressure of inflation. The outer casing is preserved in shape by means of circumferential strips 3 vulcanized on the sides of the inner tube, and a strip 4 vulcanized on the outer periphery thereof. This strip 4 is made flat and interposed between the same and the inside of casing 1 is the improved armor. This latter consists of the circumferentially disposed plates 5 and the locking members 6. Plates 5 are formed of a flat central portion 7, having a width equal to the strip 4 and a length depending on the curvature of the tire. On each side of this portion are formed arms 8 curved to fit the inside of the casing and having a bead 9 formed on the edge thereof. Each end of 7 is provided with an upturned curved bead 10 on which the locking member fits, and in the center is formed a raised lug 11. The latter is provided to give additional surface on which to vulcanize the rubber block 12. This block is segmental in cross section, and fits within the segment formed between the inside of the casing and the flat portion 7 and has a length shorter than the distance between the beads 10. These blocks serve to support the tread of the tire and transmit the compression to the strip 4, and the inner tube.

The members 5 are placed close together and over adjacent beads 10 is placed the locking bar 6, formed with the straight central portion 13, having downturned edges 14. These edges engage the inside of beads 10 and prevent longitudinal movement between the plates 5 except the small amount allowed by the clearance between parts. On the sides of 6 are formed arms 15 which fit over the arms 8 as shown in Fig. 2 and these arms are provided with a curved edge 16, which partly embraces the bead 9. Thus when assembled the locking bars 6 cover the opening between adjacent members 5 performing the double function of binding the members together and preventing any sharp instrument entering therebetween. In use enough flexibility is provided between adjacent sections that the armor can accommodate itself to the deformation of the tire as it rolls along the ground.

While I have shown the present and preferred embodiment of the invention it will be understood that changes may be made in details of construction without departing from the spirit thereof.

What I claim as new and wish to cover by Letters Patent is:—

1. A pneumatic tire comprising an outer casing, an inner tube having sufficient strength to resist the pressure of inflation, circumferentially disposed strips vulcanized on said inner tube to retain the outer casing in shape, one of said strips being arranged around the outer surface of said inner tube and having a flat surface, an armoring element disposed between said flat surface and said outer casing.

2. A pneumatic tire comprising an outer casing, an inner tube, and a flexible puncture-proof layer therebetween, said layer being formed of alternate armor plates and concaved locking members; said armor plates having a flat portion, depending curved arms to fit the outer casing, a bead on the edge of said arms, upturned curved beads on the ends of said flat portion, a raised lug in the center of said flat portion and a rubber block vulcanized to said flat portion; said locking member comprising, a concaved portion adapted to engage the upturned beads of adjacent armor plates, arms adapted to fit over the arms of said armor plates and curved ends on said first arms to fit the beads on said second arms substantially as and for the purpose described.

In testimony whereof I affix my signature in presence of two witnesses.

ANDREW W. LIVINGSTON.

Witnesses:
R. M. OYARZO,
J. M. BENHAM.

Copies of this patent may be obtained for five cents each, by addressing the "Commissioner of Patents, Washington, D. C."